United States Patent
Schlosser et al.

(10) Patent No.: US 9,105,093 B2
(45) Date of Patent: Aug. 11, 2015

(54) METHOD AND APPARATUS FOR BI-LAYER SEGMENTATION

(71) Applicant: Thomson Licensing, Issy de Moulineaux (FR)

(72) Inventors: Markus Schlosser, Hannover (DE); Lorenzo Sorgi, Hannover (DE)

(73) Assignee: Thomson Licensing LLC, Princeton, NJ (US)

( * ) Notice: Subject to any disclaimer, the term of this patent is extended or adjusted under 35 U.S.C. 154(b) by 242 days.

(21) Appl. No.: 13/783,515

(22) Filed: Mar. 4, 2013

(65) Prior Publication Data

US 2013/0230237 A1    Sep. 5, 2013

(30) Foreign Application Priority Data

Mar. 5, 2012  (EP) .................................... 12305261
Jul. 19, 2012  (EP) .................................... 12305879

(51) Int. Cl.
    *G06T 7/00*    (2006.01)
(52) U.S. Cl.
    CPC ............. *G06T 7/0079* (2013.01); *G06T 7/0081* (2013.01); *G06T 7/0087* (2013.01); *G06T 7/0093* (2013.01); *G06T 2207/10016* (2013.01); *G06T 2207/10028* (2013.01); *G06T 2207/20144* (2013.01); *G06T 2207/20221* (2013.01); *G06T 2207/30196* (2013.01)
(58) Field of Classification Search
    USPC ........................... 382/164, 165, 173, 180, 284
    See application file for complete search history.

(56) References Cited

U.S. PATENT DOCUMENTS

2011/0038536 A1    2/2011    Gong
2011/0135194 A1    6/2011    Izumi

FOREIGN PATENT DOCUMENTS

KR      100928889       11/2009
KR      20110045905      5/2011

OTHER PUBLICATIONS

J. Zhu et al.: "Joint depth and alpha matte optimization via fusion of stereo and time-of-flight sensor", CVPR 2009. IEEE Conference on Computer Vision and Pattern Recognition, 2009, pp. 453-460, XP002700137, *p. 454, right-hand column, line 40—p. 457, right-hand column, line 3.
Markus Franke Ed—Rudolf Mester et al: "Color Image Segmentation Based on an Iterative Graph Cut Algorithm Using Time-of-Flight Cameras", Aug. 31, 2011, Pattern Recognition, Springer Berline Heidelberg, Berlin, pp. 462-467, XP019163465, ISBN: 978-3-642-23122-3* p. 65, line 5-line 6.
Jue Wang et al: "Image and Video Matting: A Survey", Foundations and Trends in Computer Graphics and Vision, vol. 3, No. 2, Jan. 1, 2007, pp. 97-175, XP055035256,ISSN: 1572-2740, Do!: 10.1561/0600000019 * p. 105-p. 114.

(Continued)

*Primary Examiner* — Duy M Dang

(57) ABSTRACT

A method and an apparatus for bi-layer segmentation of an image or a sequence of images are described. A classifier is derived based on depth data of the image and another classifier is derived based on color data of the image. The image is then segmented by maximizing a weighted sum of matching scores derived from the classifiers based on depth data and color data of the image. The classifier based on color data of the image is derived using color sampling subsequent to generating an initial segmentation of the image.

30 Claims, 10 Drawing Sheets

(56) References Cited

OTHER PUBLICATIONS

Anonymous: "Chroma subsampling", Feb. 29, 2012,XP002700138, Retrieved from the Internet: URL: http:jjen.wikipedia.org/w/index.php?ti tle=Chroma subsampling&oldid=479557727 [retrieved-on Jul. 2, 2013]* the whole document *.

Anonymous: "Color sampling", Nov. 11, 2007,XP002700139, Retrieved from the Internet:URL:http://en.wikipedia.orgjwjindex.php?title=Color sampling&redirect=no [retrieved on Jul. 2, 2013]* the whole document *.

O. Arif et al.: "Visual tracking and segmentation using Time-of-Flight sensor," 17th IEEE International Conference on Image Processing, vol., No., pp. 2241-2244, Sep. 26-29, 2010.

A. Bleiweiss et al.: "Fusing Time-of-Flight Depth and Color for Real-Time Segmentation and Tracking". In Proceedings of the DAGM 2009 Workshop on Dynamic 3D Imaging (Dyn3D '09). pp. 58-69. Springer-Verlag, Berlin, Heidelberg.

C. Dal Mutto et al.: "Scene segmentation by color and depth information and its application". In: STreaming Day, Udine, Italy (2010).

E. Gastal et al.: Shared sampling for Real-Time alpha matting.Computer Graphics Forum 29 (2010) 575-584.

P.R. Giaccone et al.: Foreground-background segmentation by cellular neural networks; AUTHORS : Giaccone, P.R. Tsaptsinos, D. Jones, G.A. Sanfeliu, A. Villanueva, J.J. Vanrell, M. Alquezar, R. Eklundh, J.-O. Aloimonos, Y. Organization : Kingston Univ. SOURCE : Proceedings 15th International Conference on Pattern Recognition. ICPR-2000 | 438-41 vol. 2 | 2000PUBLISHER : IEEE Comput. Soc PUBLICATION DATE : Sep. 3-7, 2000.

D. Hall et al.: An introduction to multisensor data fusion. Proceedings ofthe IEEE 85 (1997) 6-23.

H. He et al.: Graphcut-based interactive seg-mentation using colour and depth cues. In: Australasian Conf. on Robotics andAutomation (ACRA 2010). (2010).

H. Hirschmueller et al.: Evaluation of cost functions for stereo matching.In: Computer Vision and Pattern Recognition, 2007. CVPR '07. IEEE Conferenceon. (2007) 1-8.

V. Kolmogorov et al.: "Bi-Layer Segmentation of Binocular Stereo Video". In Proceedings of the 2005 IEEE Computer Society Conference on Computer Vision and Pattern Recognition—vol. 2 , pp. 407-414.

J. Leens et al.: "Combining Color, Depth, and Motion for Video Segmentation"; Proceedings of the 7th International Conference on Computer Vision Systems, pp. 104-113, 2009.

A. Levin et al.: A closed form solution to natural image matting; Pattern Analysis and Machine Intelligence, IEEE Transactions on (vol. 30 , Issue: 2), Published on Feb. 2008.

A. Ogale et al.: "Shape and the Stereo Correspondence Problem"; Int. J. Computer Vision 65, 3 (Dec. 2005), 147-162.

M. Piccardi: "Background subtraction techniques: a review"; Systems, Man and Cybernetics, 2004 IEEE International Conference on , vol. 4, No., pp. 3099-3104 vol. 4, Oct. 10-13, 2004.

G. Shafer: A mathematical theory of evidence. Princeton university press (1976).

L. Wang et al.: "Automatic Real-Time Video Matting Using Time-of-Flight Camera and Multichannel Poisson Equations". Int. Journal of Computer Vision 97 (2012) 104-121.

J. Wang et al.: : Optimized color sampling for robust matting. In: Int.Conf. on Conference on Computer Vision and Pattern Recognition. (2007).

L. Wang et al.: "Tofcut: Towards robust real-time foreground extraction using a time-of-flight camera" In: 3DPVT Conf. (2010).

G. Zhang et al.: "Robust Bilayer Segmentation and Motion/Depth Estimation with a Handheld Camera". IEEE Transactions on Pattern Analysis and Machine Intelligence (TPAMI), 33(3): 603-617, 2011.

Wang et al.: "Automatic Real-Time Video Using Time-of-Flight Camera and Multichannel Poison Equations," one page, http://vis.uky.edu/~gravity/Research/ToFMatting/ToFMatting.htm; Jan. 14, 2012.

O. Wang et al.: "Automatic Natural Video Matting with Depth," Computer Graphics and Applications, 2007. PG '07. 15th Pacific Conference on , vol., No., pp. 469-472, Oct. 29, 2007-Nov. 2, 2007.

METHOD AND APPARATUS FOR BI-LAYER SEGMENTATION

This application claims the benefit, under 35 U.S.C. §119 of EP Patent Application 12305261.5, filed 5 Mar. 2012 and EP Patent Application 12305879.4 filed 19 Jul. 2012.

FIELD OF THE INVENTION

The invention relates to a method and an apparatus for bi-layer segmentation of an image or a sequence of images. More specifically, the invention refers to a method and an apparatus for bi-layer segmentation of an image or a sequence of images, which makes use of color information and depth information.

BACKGROUND OF THE INVENTION

The term image segmentation denotes the art of hard-cutting important objects out of an image, in the sense that each pixel is assigned to only one object. This is in contrast to alpha matting, where a continuous blending function is estimated. The general image segmentation problem is ill-defined as the definition of what an object actually is strongly depends on the task at hand. This high-level knowledge usually needs to be provided by a human operator.

A simpler scenario is given by the bi-layer segmentation, where a foreground object merely needs to be separated from the scene background. One common solution to this task is called background subtraction, where the foreground object is assumed to be moving in front of a static background. During the last years active depth sensors have become standard components of vision systems and have received much interest from the research community. For image segmentation, the scene depth represents a strong additional cue to color information as it is independent of the lighting conditions. Additionally it does not suffer from ambiguous statistical distributions between foreground objects and background scene, which are typically encountered in the color data. However, depth images captured from active sensors typically have a low resolution and are affected by parallax displacement with respect to the corresponding color images due to the physical distance of their projection centers. Therefore, depth maps and color images need to be registered, which is also a non-trivial task. In O. Wang et al.: "*Automatic Natural Video Matting with Depth*", PG '07. Proceedings of the 15th Pacific Conference on Computer Graphics and Applications (2007), pp. 469-472, a super resolution technique is used to up-sample the depth map of a time-of-flight camera to the resolution of the main color camera. Passive depth estimation like stereo matching and structure from motion do not suffer from these issues but have their own difficulties. In J. Zhu et al.: "*Joint depth and alpha matte optimization via fusion of stereo and time-of-flight sensor*", CVPR 2009. IEEE Conference on Computer Vision and Pattern Recognition (2009), pp. 453-460, a sensor setup consisting of a time-of-flight camera in conjunction with a stereo camera is used to combine the robustness of the former with the resolution of the latter.

Despite the resolution and alignment issues, depth maps can be successfully used to extract a rough initial segmentation fully automatically, without any user input. Furthermore, they allow for the construction of a rough trimap, where alpha matting techniques are directly applied. However, a precise trimap typically allows to produce much better alpha mattes and although the employed alpha matting schemes are also extended towards exploiting the available depth information, their results still suffer from the rather broad initial trimap.

The research activities on binary segmentation using color and depth may be split into two camps: feature-level fusion and decision-level fusion. In all approaches based on feature-level fusion a k-means clustering is performed on feature vectors consisting of the color components and the spatial position, including the depth, for each pixel. Basically all the decision-level fusion approaches employ a graph-cuts framework, where the depth is integrated into the data term as a statistically independent additional source of information. They typically use classical Bayesian inference. However, also a voting scheme has been proposed to combine the output of three separate classifiers based on background subtraction, color statistics and depth/motion consistency.

For many video and image editing applications, like clean background plate creation, background substitution, object tracking, 2D to 3D conversion, and many others, a robust segmentation of the foreground object from the background scene is required. Despite the ongoing research on automatic segmentation, currently this task is manually performed by an operator, drawing the silhouette of the segmentation target. This operation is called rotoscoping in the post-production industry.

SUMMARY OF THE INVENTION

It is thus an object of the present invention to propose a robust solution for automatic bi-layer segmentation of an image or a sequence of images.

According to one aspect of the invention, a method for bi-layer segmentation of an image comprises the steps of:
  deriving a classifier based on depth data of the image;
  deriving a classifier based on color data of the image; and
  segmenting the image by maximizing a weighted sum of matching scores derived from the classifiers based on depth data and color data of the image.

Similarly, an apparatus for bi-layer segmentation of an image is adapted to perform the steps of:
  deriving a classifier based on depth data of the image;
  deriving a classifier based on color data of the image; and
  segmenting the image by maximizing a weighted sum of matching scores derived from the classifiers based on depth data and color data of the image.

According to another aspect of the invention, a method for bi-layer segmentation of an image comprises the steps of:
  generating an initial segmentation of the image;
  deriving a classifier based on color data of the image using color sampling; and
  segmenting the image by maximizing a sum of matching scores derived from the classifier based on color data of the image.

Similarly, an apparatus for bi-layer segmentation of an image is adapted to perform the steps of:
  generating an initial segmentation of the image;
  deriving a classifier based on color data of the image using color sampling; and
  segmenting the image by maximizing a sum of matching scores derived from the classifier based on color data of the image.

Bi-layer segmentation is performed by processing simultaneously in a graph based framework both the color and depth data of an image or an image sequence. The pipeline is organized in two main steps. A rough segmentation is initially obtained from the statistical analysis of the depth distribution, then the image is segmented by maximizing a weighted sum of matching scores.

Depth and color data at any pixel location and a space regularization function provide the different score contributions and the resulting optimization problem is solved using graph cut, for example. This approach is used as a safer fusion strategy for the two independent classifiers based on depth and color respectively. The first classifier is preferably constructed using the statistical distribution of the depth data across the video sequence and computing the likelihood of the depth measurements given the two segmentation labels. The color classifier is based on color sampling and the segmentation scores are given by the distance in color space between each pixel and the closest within a set of samples randomly drawn from the sampling areas identified by the initial segmentation.

The invention provides an automatic tool for rotoscoping a single foreground subject from an image or an image sequence comprising color images and the corresponding depth maps. A remarkable aspect of the tool is the lack of constrains on the background scene, that is, no assumption is done regarding either its motion state or its rigid structure. Furthermore, the proposed sampling approach solves two important issues. First, it handles the case of images with similar statistical distributions of the color data in the background and foreground areas. Second, is can naturally handle small holes on the foreground and background masks, which could severally corrupt the performance of the color sampling.

One advantage of the proposed solution is that it allows for an automatic segmentation. The system receives as input a color image or a sequence of color images and depth maps aligned on a common reference frame and provides as output a foreground/background bi-layer segmentation map in a fully automatic way. No human interaction is needed, nevertheless the processing pipeline is suitable to hold human hints, when these are available. Indeed, the graph framework can naturally enforce the labeling constraints on some image areas, provided by the user by mean of some scribbles.

Instead of a probabilistic framework, the present invention for the first time uses color sampling in the binary segmentation pipeline. This technique has been already exploited for alpha matting as an accurate trimap is available. Indeed in color sampling for each pixel within the unknown area of the trimap a few samples are drawn from the nearby foreground and background areas and if the trimap is rather broad it may happen that sampling zones are too distant from the reference pixel and the sampled pixels becomes meaningless. This is not the case in alpha matting where a narrow trimap is available, and it is the reason why so far this technique has not been used for binary segmentation. In the present system a rough initial trimap is automatically extracted using the depth map, but due to its inaccuracy the standard color sampling cannot be successfully employed. Therefore, its basic constraint is relaxed, that is the samples are drawn from both the labeled and unlabeled areas.

In any graph-based image segmentation algorithm the edge capacities are computed as a function of the local image contrast. Different approaches to measure the image contrast have been proposed in literature, nevertheless in the field of graph-based image segmentation it is always computed as the distance in color space between neighboring pixels. In case of blurred images the color intensity smoothly varies between neighboring pixels and the contrast information carried by neighboring pixel pairs may become too weak. According to the present invention, the dimension of the neighborhood used to measure the image contrast is increased up to four pixels. Considering a pixel pair (b, c), then the quadruplet of aligned pixels (a, b, c, d) is used to compute the local contrast, which is given by the highest color distance provided by the pairs (a, c) and (b, d).

In line with classical Bayesian inference, the output of statistically independent classifiers is typically combined as a sum of log-likelihood ratios. For some applications (like e.g. image segmentation), it should, however, be safer to use the proposed weighted sum of matching scores as fusion strategy. This allows for a more sensible treatment of the critical case where a pixel can neither be explained well by the foreground nor the background model, i.e. both likelihoods are close to zero. In such a case, it should be safer to assume that basically no information is provided by the classifier. Even if all classifiers happen to be undecided, in case of image segmentation, the correct classification for a pixel may still be inferred from its neighbors.

Bi-layer segmentation is a low level tool, which is part of many computer vision applications. Possible applications include:

Background Modeling. This processing is aimed to the creation of a background panoramic image from a set of still images, or a video sequence captured from a moving camera. The knowledge of the foreground subject provides an important support for the estimation of the panoramic geometry.

Background Substitution. This processing is aimed to the replacement in a video sequence of the background scene behind the foreground subject with a new one. Such an application needs the knowledge of an accurate segmentation mask.

2D to 3D Conversion. The conversion of a movie from 2D to 3D needs the accurate segmentation mask of subjects located at different depth, in order to apply the correct disparity field in post processing. The proposed segmentation system can be integrated within the 2D to 3D conversion pipeline, as long as at least one color sequence has its corresponding depth map. The latter can be provided as a sequence of range scans captured by an active sensor, a sequence of disparity maps computed from a passive stereo camera, or it can be an a-dimensional 3D model also computed from a single view using Structure From Motion.

Videoconferencing and Telepresence. This application allows remotely located people to cooperate and interact within a common virtual environment. The segmentation of the foreground subject from the video-sequences minimizes the volume of transferred data between the remote sites.

Alpha Matting. Alpha matting is the soft segmentation of video objects, with the simultaneous estimation of a continuous point-wise blending function between the foreground and background colors. For this purpose an accurate binary segmentation is needed in input, in order to restrict the processing domain to the actual contour of the target objects.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
FIG. 1 shows an image to be segmented.

The two main steps of the overall segmentation pipeline comprise five major sub-steps. Furthermore, two datasets $\mathbb{D}$ and $\mathbb{L}$ are stored and updated across the video sequence. They collect the history of the depth values and their corresponding segmentation labels. In the following the segmentation label for the i-th pixel will be denoted with $\alpha_1$ and the notation $\alpha=0$ for the background and $\alpha=1$ for the foreground pixels, respectively, will be adopted.

Source data normalization. The color image and the depth maps are normalized in the interval [0, 1]. Although this is a usual step, it is pointed out here since also afterwards, across the whole processing chain, all the involved variables will be normalized. This allows for an easy tuning of the system parameters.

Initial segmentation. The construction of the segmentation graph is not approached directly. Instead it is proposed to perform an initial rough segmentation based only on an analysis of the depth histogram. A trimap is then generated by dilating this segmentation contour. Only the pixels belonging to the unknown area $\mathbb{U}$ within this trimap will then be considered in constructing the segmentation graph, while the outside regions are directly labeled as foreground and background.

Statistics learning. The statistical models of the depth measurements are learned from the samples available in the sets $\mathbb{D}$ and $\mathbb{L}$. The color data will instead be processed within a sampling scheme so that no statistical model is needed.

Graph building and cut. The segmentation labeling problem is formulated in terms of a cost function minimization. For the unknown area $\mathbb{U}$ of the trimap, a graph is constructed in order to refine the binary segmentation in the form of a minimum cut/maximum flow solution. The framework combines the depth with the color information.

Data set update. At the end of each segmentation cycle, the gathered information is integrated into the processing pipeline. The set $\mathbb{D}$ is updated with the depth dataset $D$ of the current frame. The set update is performed by means of a memory factor $\mu$, $\mathbb{D} \leftarrow \mathbb{D}_\mu \cup \mathbb{D}_{1-\mu}^+$, where the notation $\mathbb{D}_\mu$ means that a fraction of $\mu$ samples are randomly extracted from the set $\mathbb{D}$. In the present implementation $\mu$ is set to 25%. The set $\mathbb{L}$ is updated accordingly.

The initial rough segmentation is obtained using only the depth measurements. The histogram of the data available in the set $\mathbb{D}$ is constructed and a foreground/background segmentation threshold $d_{th}$ is determined as $$d_{th} = d_{m0} + \rho \cdot (d_{m1} - d_{m0}) \quad (1)$$

where $d_{m0}$ and $d_{m1}$ are the first two peaks in the depth histogram. Here it is assumed that there is a significant jump in depth between the foreground object and the rest of the scene. For such scenes, the depth values of this foreground object should form one well-defined first peak in the depth distribution. In the present implementation, the parameter $\rho$ (ranging in the interval [0, 1]) is set to 0.5 as the initial segmentation should preferably not be biased neither towards the foreground nor the background. If the assumption is violated and only one peak is detected, $d_{m1}$ is set to one.

Figure 2:
FIG. 2 shows a depth map associated to the image of FIG. 1.
Figure 3:
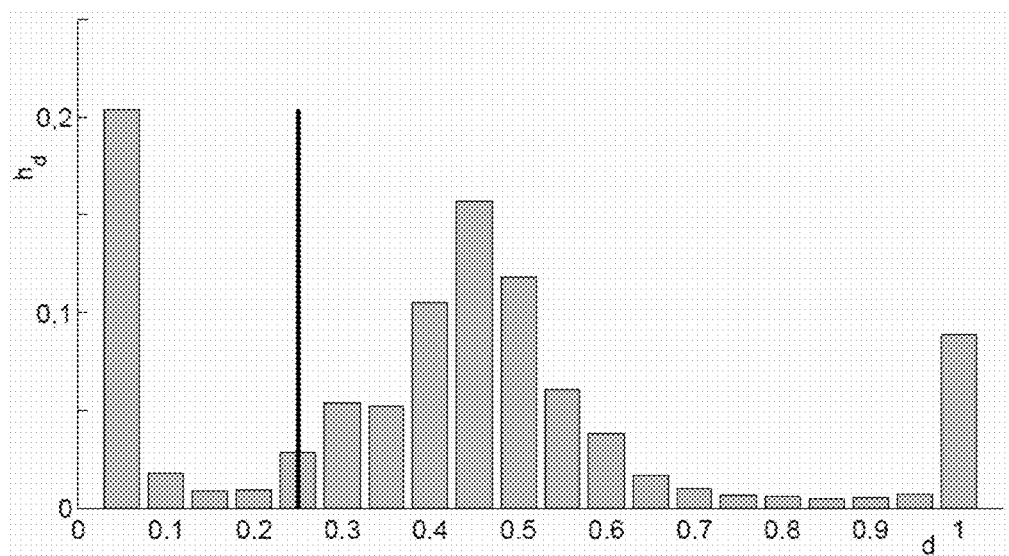
FIG. 3 illustrates a normalized histogram computed from the depth map of FIG. 2.
Figure 4:
FIG. 4 depicts a trimap for the image of FIG. 1 expanded from a segmentation contour.

The initial segmentation is then dilated and eroded in order to construct a trimap. The dimension of the structuring elements applied by the morphological operators is empirically set to 10% of the image width. It has been observed that the resulting trimap is wide enough to cope with the inaccuracy of the depth based segmentation. FIGS. 1 to 4 show an example of a trimap generated by this scheme. FIG. 1 shows the original image 1 to be segmented, FIG. 2 shows the associated depth map 2. FIG. 3 illustrates a normalized histogram $h_d$ is computed from the depth map. A value illustrated by the black line between the first two peaks of the normalized histogram $h_d$ is taken as a segmentation threshold. FIG. 4 depicts a trimap 3 expanded from the segmentation contour.

In the literature a general trend to use a Single Gaussian Model (SGM) to capture the two conditional probabilities of the depth values for the foreground and background areas can be observed. In most of the cases this is a sufficiently robust representation, but it is prone to gross errors just in those areas where the segmentation inference is most trivial. When the background contains multiple depth layers, the SGM is likely to be polarized towards one of them and it may happen that the farthest peak in the depth distribution is quite poorly represented, i.e. both the foreground and background likelihoods are very low for high depth values. Mostly this is not an issue when a log-likelihood classifier is used, because it uses the ratio of the likelihood functions. However, there is a non-negligible possibility that the estimated probability densities cross in the far depth zone, which makes the depth classifier unreliable.

For the present implementation this problem is even more relevant because the probability densities will be used as match scores instead of the log-likelihoods, in order to be consistent with the choice of a cost based framework, with all the costs ranging in the interval [0, 1]. Therefore, a Single-Side Gaussian Model (SSGM) is used, which is more realistic and slightly easier to learn:

$$p(d \mid \alpha = 1) = \begin{cases} C_1 \cdot e^{-\frac{1}{2}\left(\frac{d-0}{\sigma_1}\right)^2} & d \geq 0 \\ 0 & d < 0 \end{cases} \quad (2)$$

$$p(d \mid \alpha = 0) = \begin{cases} C_0 \cdot e^{-\frac{1}{2}\left(\frac{d-1}{\sigma_0}\right)^2} & d \leq 1 \\ 0 & d > 1 \end{cases} \quad (3)$$

Figure 5:
FIG. 5 shows a likelihood map for the image of FIG. 1 computed using a Single Gaussian Model.
Figure 6:
FIG. 6 shows a likelihood map for the image of FIG. 1 computed using a Single-Side Gaussian Model.

The parameters $C_0$ and $C_1$ are estimated using the constraint that the likelihood must integrate to 1. The standard deviations $\sigma_0$ and $\sigma_1$ are learnt from variances of two subsets $\mathbb{D}_o$ and $\mathbb{D}_1$ obtained by dividing the set $\mathbb{D}$ according to the labels set $\mathbb{L}$. FIGS. 5 and 6 show a comparison between the background likelihood map computed using the SGM (FIG. 5) and the SSGM (FIG. 6) proposed in equation (3). It is apparent that the far background area is not properly captured by the SGM, due to the presence of multiples depth layers.

Let $\mathbb{B} = \{0, 1\}$ denote the space of binary labels and $\alpha = [\alpha_0, \ldots, \alpha_{N-1}]^T \in \mathbb{B}$ the N-dim vector collecting the pixel labels. Then the binary image segmentation is given by the labeling vector which minimizes the following objective function defined over $\mathbb{B}^N$:

$$\alpha = \min_{\alpha \in \mathbb{B}^N} \left\{ \sum_{i \in \mathbb{U}} E_{d,i}(\alpha_i) + w_s \sum_{(i,j) \in \mathbb{N}} E_{s,i,j}(\alpha_i, \alpha_j) \right\}, \quad (4)$$

where $\mathbb{N}$ is the set of neighboring pixels belonging to $\mathbb{U}$, the data term $E_{d,i}$ is the contribution to the overall cost computed from the measurements provided by the pixel i, and finally the smoothness term $E_{s,i,j}$ is the cost contribution, which assigns a penalty for each pair of neighbor pixels differently labeled.

The solution to the problem in equation (4) is then obtained via graph cut. A graph is a collection of nodes and interconnecting edges. When it is used to model the segmentation process of an image of resolution (W,H), the graph contains a set of $N_n = (W \cdot H + 2)$ nodes, since two additional virtual nodes are required to represent the segmentation labels. The cardinality of the edge set depends on the type of neighborhood model. When the 4-connected neighborhood is adopted, the graph counts an overall number of $N_e = (3W \cdot H - W - H)$ edges. In the present implementation only the unlabeled pixels belonging to $\mathbb{U}$ contribute to the graph, whose size is, therefore, considerably reduced.

Ultimately, the core of each graph-based algorithm is the assignment of the capacities to each edge of the graph. The edges connecting neighboring nodes form the smoothness term in equation (4), while the edges connecting the nodes with the two virtual nodes, usually denoted as t-links, model the data term in equation (4). The latter is usually computed by means of a monotonic decreasing function of the likelihood of the pixel data, given the segmentation labeling. Since 3D color vectors and scalar depth measurements are available for each pixel, the data term is computed as a weighted sum of two independent contributions:

$$E_{d,i}(\alpha) = w_c E_{c,i}(\alpha) + w_z E_{z,i}(\alpha), \quad (5)$$

where the indexes $(\ )_c$ and $(\ )_z$ identify the costs computed from the color and depth values.

The overall cost function comprises by three main contributions, which are balanced by means of the corresponding weights $w_s$, $w_c$ and $w_z$.

The first contribution to the data term in equation (5) is computed from the 3D color vectors. Commonly this is done within a probabilistic framework. First a statistical model suitable to describe the color distribution in the foreground and background areas is learnt, then the corresponding costs are computed as the negative log-likelihood of the color data, given the labeling conditions. Learning the probabilistic models is not easy, since it is prone to numerical instability and over- or under-fitting problems. A hybrid approach aimed to match the two Gaussian Mixture Models for the background/foreground areas (HGMM), using 3D histograms in color space as intermediate representation.

Mostly because of its cumulative nature, which leads to a loss of any spatial information, such a global statistical model is not the best choice in the context of image segmentation. Besides it is not unrealistic that background and foreground areas have similar color distributions. Therefore, the present implementation makes use of a more aggressive technique based on local color sampling instead. For each pixel in the set $\mathbb{U}$, two sets of color samples $\mathbb{S}_0$ and $\mathbb{S}_1$ are randomly extracted from near foreground/background areas. Then the color contribution in equation (5) is computed as the Euclidean distance in color space between the reference pixel and the best sample available in each of two sample sets:

$$E_{c,i}(\alpha) = \min\left\{ th_c, \frac{1}{\sqrt{3}} \cdot \min_{s \in \mathbb{S}_\alpha} \|I_i - I_s\| \right\}. \quad (6)$$

Figure 9:
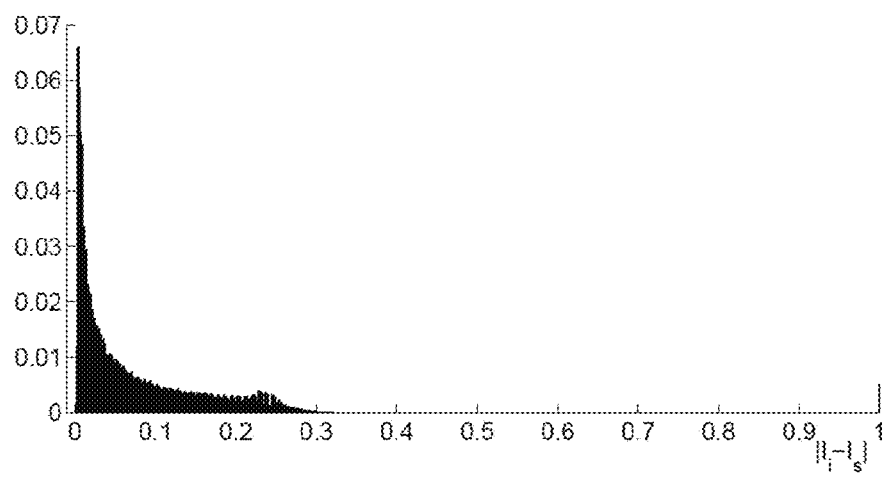
FIG. 9 shows a histogram of the color distance obtained across a test video sequence using the risky sampling scheme.

The threshold $th_c$ is used to bound the contribution of outlier samples with large errors. In the present implementation it is empirically set to 0.1. By inspection of the normalized histogram of the measure of equation 6 computed over a video sequence, as depicted in FIG. 9, it can be seen that this value safely includes the 75th percentile of the error distribution. Therefore, it is guaranteed to cut-off only the cost contribution of certainly wrong samples.

However, the color sampling scheme has a considerable drawback. It requires a-priori knowledge of the sampling areas. For this reason it has been proposed and successfully exploited for Alpha Matting, where a quite accurate segmentation is available and the samples within the foreground/background areas can be easily extracted for each pixel of the set $\mathbb{U}$. In the general context of binary segmentation this information is not available, and there has not yet been any approach using the sampling scheme. Also, in the present scenario the sampling scheme cannot be applied easily, since the unknown area U needs to be grown as a broad strip in order to cope with the inaccuracy of the initial segmentation.

In the following a reliable and fast technique to set the width of the area $\mathbb{U}$ is described, which provides a satisfying trade-off between the sampling effectiveness and the robustness against the initialization inaccuracy.

Figure 7:
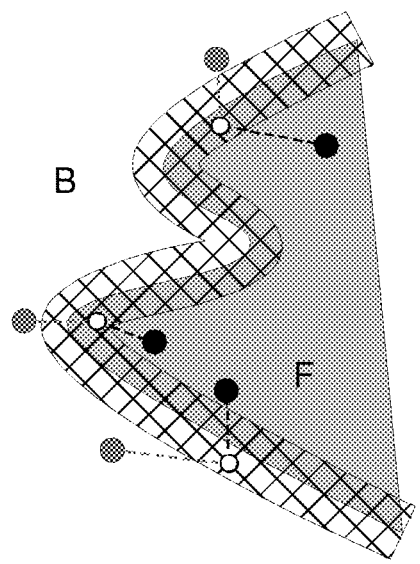
FIG. 7 illustrates a conservative approach for color sampling.
Figure 8:
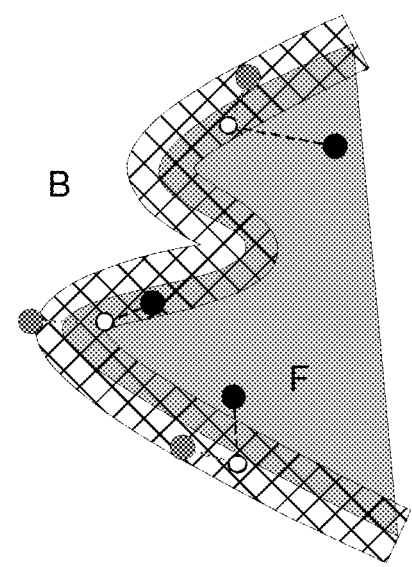
FIG. 8 illustrates a risky sampling scheme.

The present implementation uses a risky sampling scheme, which relaxes the assumptions on the sampling areas. Instead of performing the color sampling only inside the foreground/background areas identified by the trimap, those sampling areas identified by the initial segmentation are considered as eligible. In other words, the foreground/background samples drawn for the unknown pixels could possibly belong to the same area $\mathbb{U}$. This is schematically illustrated in FIGS. 7 and 8, where the gray area represents the foreground area and the hashed area represents the unknown area $\mathbb{U}$ produced by the initial depth based segmentation. FIG. 7 shows a conservative approach for color sampling. The foreground and background samples (represented by the gray and black circles) are drawn only in the areas outside $\mathbb{U}$, as it is typically done in Alpha Matting. FIG. 8 depicts the approach chosen for the present implementation. The samples are drawn within the initial segmentation areas and, therefore, may belong as well to $\mathbb{U}$. A histogram of the color distance obtained across a test video sequence using the proposed sampling scheme is depicted in FIG. 9.

The sampling is implemented by two steps: first a random direction toward the sampling area is chosen, then a sample is drawn on a sampling segment aligned with the selected direction. The sampling segment starts on the contour of the sampling area and has a length equal to the width of the area $\mathbb{U}$.

Figure 10:
FIG. 10 shows a likelihood map computed using a Hierarchical Gaussian Mixture Model.
Figure 11:
FIG. 11 shows a likelihood map computed using the sampling scheme proposed in equation (6)
Figure 12:
FIGS. 12-23 illustrate segmentations results obtained for four different test video sequences.
Figure 13:
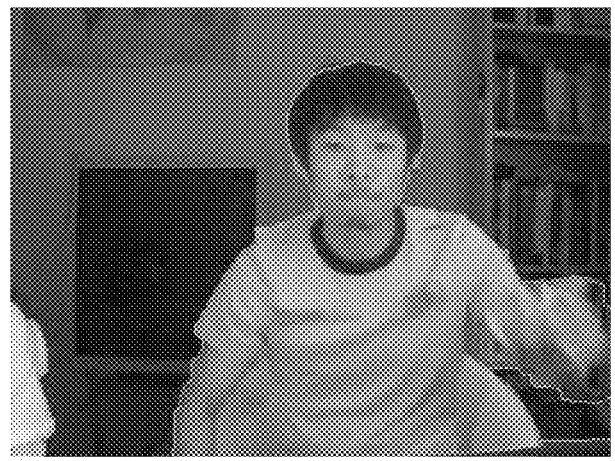

It is worth to point out that a satisfying discrimination power was achieved using only one sample for each area, as can be seen from FIGS. 10 and 11, which show a comparison between the background color likelihood map computed using the HGMM (FIG. 10) and the pseudo-likelihood map computed using the sampling scheme proposed in equation (6) (FIG. 11). The bright areas denote high likelihood.

Allowing for the sampling within the unknown area implicitly enables to cope in a natural way with a certain group of circumstances. Any time the spatial extent of a foreground or background patch is smaller than the width of the domain $\mathbb{U}$, it will be absorbed during the trimap expansion. This happens, for example, when a foreground has small internal holes, thin in/outward lobes, or it is too near to the image border. In all these circumstances the original sampling scheme is unfeasible. The implemented approach instead naturally solves this problem, since the trimap identifies only the set of unknown pixels for which the color samples are required. It does not identify the sampling zones, which are instead provided by the initial depth-based segmentation. FIGS. 12 to 23 depict segmentation results on three sample frames selected from four test video sequences.

Figure 14:
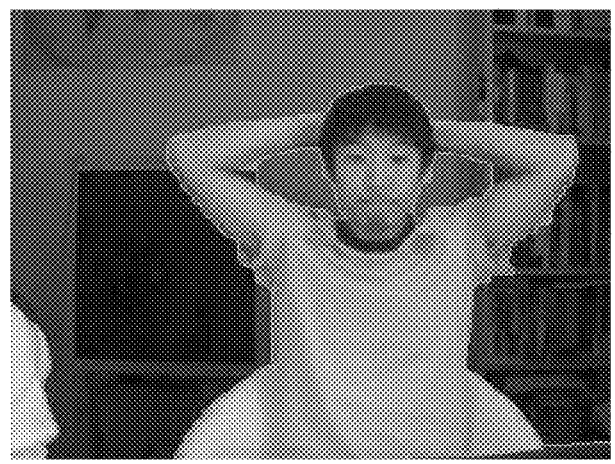
Figure 15:
Figure 16:
Figure 17:
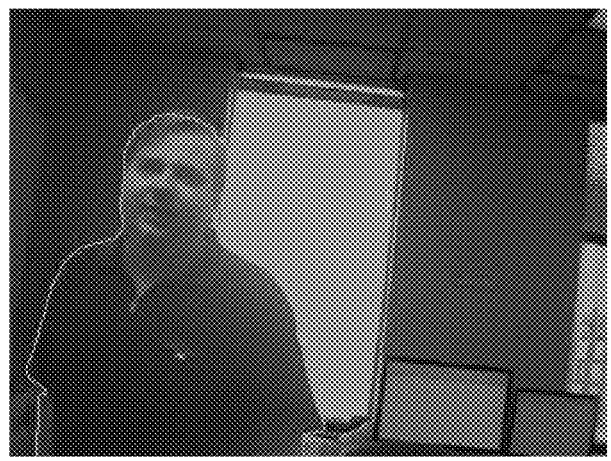
Figure 18:
Figure 19:
Figure 20:
Figure 21:
Figure 22:
Figure 23:

In FIG. 14 the foreground subject creates two circles with the arms and the background area inside these circles disappears during the trimap expansion. Similarly, in FIG. 17 the subject is very close to the image border and the trimap absorbs the small residual background area. Nevertheless, in both the cases the proposed sampling scheme can still provide a quite accurate result.

The second contribution to the data term in equation (5) is extracted from the depth measurement of each pixel. As previously mentioned, the general trend is to cast the overall estimation within a probabilistic framework. The underlying assumption of statistical independency between the depth and color random variables leads to sum up in the final cost function the negative log-likelihood measures. The SSG model proposed above for the depth values will, however, be used within a non statistical framework, rather to specify one of the two independent classifiers. Following this approach the classification cost for the depth measurement is defined as $$E = \delta_{\alpha,0} + (1 - 2\delta_{\alpha,0})P(d|\alpha), \tag{7}$$

where $P(d|\alpha)$ is the distribution function given by the SSM model introduced further above and $\delta_{\alpha_i,\alpha_j}$ is the Kronecker Delta function. This cost measure is bounded in the interval [0, 1], in accordance with the other involved measures.

The smoothness term in equation (4) provides an additional penalty to the overall cost for each pair of neighboring pixels with different segmentation labels. This penalty is preferably tightly related to the image contrast, in order to penalize a change in labeling inside homogeneous areas. However, it has been observed that the contrast measure computed from a pair of neighboring pixels is sensitive to both noise and blur. Therefore, the dimension of the neighborhood is slightly increased from two to four pixels. Let (1, i, j, k) be a quadruplet of aligned consecutive pixels, then the color contrast between the pixels i and j is computed as $$\Gamma_{i,j} = \frac{1}{\sqrt{3}} \cdot \max\{\|I_l - I_j\|, \|I_i - I_k\|\}, \tag{8}$$

where the normalization factor is used to bound the contrast measure in the range [0, 1]. Using this contrast measure (8) the smoothness term is computed as $$E_{s,i,j}(\alpha_i, \alpha_j) = \delta_{\alpha i,\alpha j} \cdot \min\{\text{th}_c, 1 - \Gamma_{i,j}\}, \tag{9}$$

where $\delta_{\alpha_i,\alpha_j}$ is the Kronecker Delta function, and $\text{th}_c$ is the threshold used in equation (6). Compared to other tested measures based on the image gradient, on the image response to circular harmonic filters, or derived for the binary edge map, this is the one which has provided the best performance.

All the cost measures proposed above range in the interval [0, 1]. Therefore, it is easy to assign meaningful weights to the different contributions. It has been observed that the depth measurement provides a reliable clue in the initialization phase and it allows for the extraction of a rough segmentation trimap. However, the low resolution of the sensor usually makes the measurements inaccurate across the foreground borders. This is also the main reason why the depth information has not been used in the computation of the smoothness term (equation (9)). On the other hand, the color sampling strategy turned out to be quite reliable and it is believed that the corresponding energy (equation (6)) should provide the main driver for the segmentation process. Finally, the smoothness term turns out to play the role of supporting the overall process rather than deciding where the segmentation should actually be, therefore it gets assigned the lowest weight within the overall cost. Following this qualitative analysis, for a set of test sequences the weights are set to $w_c = 5$, $w_d = 1$, and $w_s = 0.5$.

For an evaluation test the data set available online at http://vis.uky.edu/~gravity/Research/ToFMatting/ToFMatting.htm with the corresponding ground truth has been used. Table 1 summarizes the obtained results compared with those obtained by the provider of the dataset, see L. Wang et al.: "*TofCut: Towards robust real-time foreground extraction using a time-of-flight camera*", 3DPVT Conf. (2010). FIGS. 12 to 23 present segmentation samples from these video sequences.

TABLE 1

Comparison between the proposed segmentation technique and TofCut obtained on four test video sequences.

| | Seq. ID | | | | | | | |
|---|---|---|---|---|---|---|---|---|
| | WL | | MS | | MC | | CW | |
| | Frames | | | | | | | |
| | 200 | | 400 | | 300 | | 300 | |
| Alg. | TofCut | Sampling | TofCut | Sampling | TofCut | Sampling | TofCut | Sampling |
| % Err. | 1.35 | 0.59 | 0.51 | 0.19 | 0.15 | 0.07 | 0.38 | 0.18 |

The mean percentage error computed over the whole image and across the whole sequence is provided.

The results presented in Table 1 show that the proposed method can outperform TofCut in most of the tested sequences, although the latter is already very accurate. In the sequence CW the second subject is not correctly segmented by the implemented algorithm. The error rate provided in Table 1 for this sequence is computed without considering the misclassified pixels of the frames within the interval [60, 160], where the second subject is present. Still this result is considered relevant for three reasons. First, the moving subject is perceived by the depth sensor at the same distance as the static foreground, the misclassification is mostly due to the limitations of the sensor and it was not intended to provide a modeling for such a limitation. Many sensors are available on the market which may not suffer of this sort of limitations. On the other hand in the present implementation patches with similar depth are all considered as part of the foreground even if spatially distant. Second, it is also interesting to notice that after the disappearance of the second subject the algorithm does not suffer from any segmentation drift toward other parts of the background scene. Indeed, it is able to recover correctly the segmentation mask of the main foreground subject. Third, in the above mentioned article by L. Wang et al. an adaptive weighting scheme is introduced mostly to handle this sort of scenes, and the same approach could be integrated as well within the present system if needed.

Figure 24:
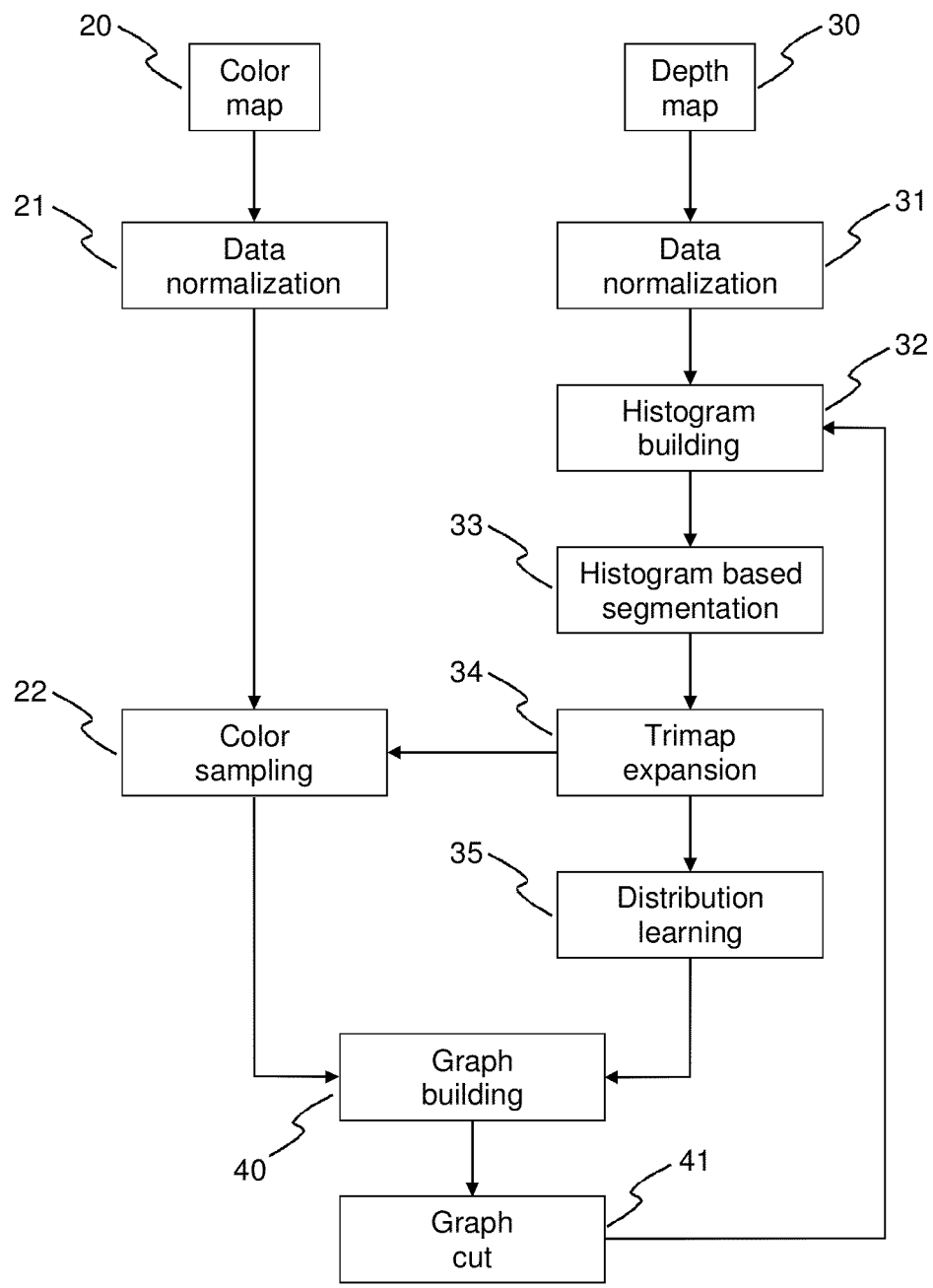
FIG. 24 depicts a flowchart of a method according to the invention.

FIG. 24 depicts a flowchart of a method according to the invention. The input data, i.e. the color map 20 and the depth map 30, are initially preprocessed in normalization steps 21, 21 in order to constraint the data within a unit norm interval. Then a trimap is expanded 34 from the rough segmentation 33 based on a depth histogram obtained in a histogram building step 32. The depth data available within the background region is used to update 35 the depth statistical distribution. Finally a segmentation graph for the unlabelled area of the trimap is built 40 using the depth and color likelihood maps, which are constructed using the depth distribution and color sampling 22. The final segmentation mask is obtained in a graph cut step 41 using the mincut/maxflow algorithm and the labeled depth data are used to update the depth histogram from the next frame.

What is claimed is:

1. A method for bi-layer segmentation of an image, the method comprising
    deriving a classifier based on depth data of the image;
    deriving a classifier based on color data of the image; and
    segmenting the image by maximizing a weighted sum of matching scores derived from the classifiers based on depth data and color data of the image.

2. The method according to claim 1, wherein the classifier based on color data of the image is derived using color sampling.

3. The method according to claim 1, further comprising generating an initial segmentation of the image.

4. The method according to claim 3, wherein the initial segmentation of the image is generated based on depth data associated to the image.

5. The method according to claim 4, wherein the initial segmentation of the image is generated by performing a statistical analysis of a depth distribution of the image or further images of an image sequence comprising the image.

6. The method according to claim 1, wherein the classifier based on depth data is constructed using a statistical distribution of the depth data across the image and computing a cumulative likelihood of depth measurements.

7. The method according to claim 1, wherein the classifier based on color data is derived using color sampling, where matching scores are given by a distance in color space between each pixel and a closest sample within a set of samples randomly selected from a specific area of the image.

8. The method according to claim 1, wherein maximizing the weighted sum of matching scores is performed using a discrete optimization technique.

9. The method according to claim 8, wherein the discrete optimization technique is graph cut.

10. A method for bi-layer segmentation of an image, the method comprising
    generating an initial segmentation of the image;—deriving a classifier based on color data of the image using color sampling; and
    segmenting the image by maximizing a sum of matching scores derived from the classifier based on color data of the image.

11. The method according to claim 10, wherein the initial segmentation of the image is generated based on depth data associated to the image.

12. The method according to claim 11, wherein the initial segmentation of the image is generated by performing a statistical analysis of a depth distribution of the image or further images of an image sequence comprising the image.

13. The method according to claim 10, wherein the classifier based on color data is derived using color sampling, where segmentation scores are given by a distance in color space between each pixel and a closest sample within a set of samples randomly selected from a specific area of the image.

14. The method according to claim 10, wherein maximizing the sum of matching scores is performed using a discrete optimization technique.

15. The method according to claim 14, wherein the discrete optimization technique is graph cut.

16. An apparatus for bi-layer segmentation of an image, wherein the apparatus is configured to perform:
    deriving a classifier based on depth data of the image;
    deriving a classifier based on color data of the image; and
    segmenting the image by maximizing a weighted sum of matching scores derived from the classifiers based on depth data and color data of the image.

17. The apparatus according to claim 16, wherein the apparatus is configured to derive the classifier based on color data of the image using color sampling.

18. The apparatus according to claim 16, wherein the apparatus is further configured to generate an initial segmentation of the image.

19. The apparatus according to claim 18, wherein the apparatus is configured to generate the initial segmentation of the image based on depth data associated to the image.

20. The apparatus according to claim 19, wherein the apparatus is configured to generate the initial segmentation of the image by performing a statistical analysis of a depth distribution of the image or further images of an image sequence comprising the image.

21. The apparatus according to claim 16, wherein the apparatus is configured to construct the classifier based on depth data using a statistical distribution of the depth data across the image and computing a cumulative likelihood of depth measurements.

22. The apparatus according to claim 16, wherein the apparatus is configured to derive the classifier based on color data using color sampling, where matching scores are given by a distance in color space between each pixel and a closest sample within a set of samples randomly selected from a specific area of the image.

23. The apparatus according to claim 16, wherein the apparatus is configured to maximize the weighted sum of matching scores using a discrete optimization technique.

24. The apparatus according to claim 23, wherein the discrete optimization technique is graph cut.

25. An apparatus for bi-layer segmentation of an image, wherein the apparatus is configured to perform:
   generating an initial segmentation of the image;
   deriving a classifier based on color data of the image using color sampling; and
   segmenting the image by maximizing a sum of matching scores derived from the classifier based on color data of the image.

26. The apparatus according to claim 25, wherein the apparatus is configured to generate the initial segmentation of the image based on depth data associated to the image.

27. The apparatus according to claim 26, wherein the apparatus is configured to generate the initial segmentation of the image by performing a statistical analysis of a depth distribution of the image or further images of an image sequence comprising the image.

28. The apparatus according to claim 25, wherein the apparatus is configured to derive the classifier based on color data using color sampling, where segmentation scores are given by a distance in color space between each pixel and a closest sample within a set of samples randomly selected from a specific area of the image.

29. The apparatus according to claim 25, wherein the apparatus is configured to maximize the sum of matching scores using a discrete optimization technique.

30. The apparatus according to claim 29, wherein the discrete optimization technique is graph cut.

* * * * *